US012546448B2

(12) United States Patent
Gao et al.

(10) Patent No.: US 12,546,448 B2
(45) Date of Patent: Feb. 10, 2026

(54) LED AUTOMOBILE LAMP

(71) Applicant: Jiaxing Guangtai Lighting Co., Ltd., Zhejiang (CN)

(72) Inventors: Hui Gao, Zhejiang (CN); Huojun Gu, Zhejiang (CN); Lihua Hu, Zhejiang (CN); Linghui Chen, Zhejiang (CN); Haifeng Wan, Zhejiang (CN); Chengjie Zhu, Zhejiang (CN)

(73) Assignee: Jiaxing Guangtai Lighting Co., Ltd., Jiaxing (CN)

( * ) Notice: Subject to any disclaimer, the term of this patent is extended or adjusted under 35 U.S.C. 154(b) by 0 days.

(21) Appl. No.: 19/002,645

(22) Filed: Dec. 26, 2024

(65) Prior Publication Data

US 2026/0002648 A1 Jan. 1, 2026

(30) Foreign Application Priority Data

Jul. 1, 2024 (CN) ......................... 202410870910.9

(51) Int. Cl.
*F21S 41/148* (2018.01)
*F21S 41/19* (2018.01)
(Continued)

(52) U.S. Cl.
CPC ............. *F21S 41/148* (2018.01); *F21S 41/19* (2018.01); *F21S 41/32* (2018.01); *F21S 45/48* (2018.01); *F21V 23/06* (2013.01)

(58) Field of Classification Search
CPC .......... F21S 41/148; F21S 41/19; F21S 41/32; F21S 45/48; F21V 23/06
See application file for complete search history.

(56) References Cited

U.S. PATENT DOCUMENTS

2003/0227774 A1* 12/2003 Martin .................... F21V 29/77 362/240
2009/0296416 A1* 12/2009 Luo ....................... F21S 41/334 362/487
(Continued)

FOREIGN PATENT DOCUMENTS

CN 105444081 A * 3/2016 .............. F21V 23/00
CN 207132262 U * 3/2018 .............. F21S 45/47

OTHER PUBLICATIONS

English translation of Zhu CN-105444081-A (Year: 2016).*
English translation of Wang CN-207132262-U (Year: 2018).*

*Primary Examiner* — Evan P Dzierzynski

(57) ABSTRACT

The present application discloses an LED automobile lamp, which comprises a light source component and a driving component, wherein the light source component is driven to be bright or dark by the driving component; the light source component comprises a heat pipe, a first reflector, a second reflector and an LED patch assembly; the first reflector and the second reflector are respectively sleeved outside the heat pipe; the LED patch assembly consists of a plurality of LED patches which are respectively fixed around the outer wall of the heat pipe and arranged between the first reflector and the second reflector. On the one hand, the light intensity distribution can meet the specified requirements of published relevant laws and regulations; on the other hand, compared with the rear lamp light distribution of the traditional halogen lamp, the LED patch assembly has less distortion and can bring better safety and comfort.

20 Claims, 4 Drawing Sheets

(51) Int. Cl.

| | |
|---|---|
| ***F21S 41/32*** | (2018.01) |
| ***F21S 45/48*** | (2018.01) |
| ***F21V 23/06*** | (2006.01) |

(56) References Cited

U.S. PATENT DOCUMENTS

| | | | | |
|---|---|---|---|---|
| 2010/0181885 | A1* | 7/2010 | Tessnow ................. | F21S 43/14<br>313/1 |
| 2021/0396370 | A1* | 12/2021 | Kessels ................... | F21S 45/47 |

* cited by examiner

LED AUTOMOBILE LAMP

CROSS-REFERENCE TO RELATED APPLICATION

This application claims priority of Chinese Patent Application No. 202410870910.9, filed on Jul. 1, 2024, the entire contents of which are incorporated herein by reference.

TECHNICAL FIELD

The present application relates to the technical field of lamps, in particular to the technical field of LED automobile lamps.

BACKGROUND

At present, for the LED replacement light source of motor vehicle headlights, after several years of development, the domestic market is full of all kinds of LED replacement products, and the problems in the light distribution compliance of the whole lamp are more prominent, for example the hidden dangers of too bright low and high beams, excessive glare in low beam and dark areas in low beam, which bring great risks to road traffic safety. For this reason, the laws and regulations that regulate the industry and market from the perspectives of product geometric size, photoelectric parameters and electrical performance have gradually appeared in the automobile lamp market, such as ECE R37:2022 3.4.4 and R.E.5:2023 data sheet H11 LED. However, the light intensity distribution of the existing LED replacement light sources in the market can not fully meet the relevant requirements of such regulations (unlike other light sources, the photometric and colorimetric performance of LED lamps mainly depends on the wafer and phosphor, and the luminous characteristics of different LED arrangements are different), which needs to be solved urgently.

SUMMARY

The object of the present application is to solve the problems in the prior art by proposing an LED automobile lamp. On the one hand, the light intensity distribution can meet the specified requirements of published relevant laws and regulations; on the other hand, compared with the light distribution of traditional halogen lamps, the LED automobile lamp has less distortion and can bring better safety and comfort.

In order to achieve the above object, the present application provides an LED automobile lamp, which includes a light source component and a driving component, wherein the light source component is driven by the driving component to be bright or dark; the light source component includes a heat pipe, a first reflector, a second reflector and an LED patch assembly; the first reflector and the second reflector are respectively sleeved outside the heat pipe; the LED patch assembly consists of a plurality of LED patches which are respectively fixed around an outer wall of the heat pipe and arranged between the first reflector and the second reflector.

Preferably, the LED patch assembly includes four LED patches, and the four LED patches are rotationally and symmetrically distributed with a central axis of the heat pipe as a reference axis.

Preferably, a normal directions of a light-emitting surfaces of the four LED patches coincide with a 45-degree angular position, a 135-degree angular position, a 225-degree angular position and a 315-degree angular position respectively.

Preferably, a distance between a geometric center of the LED patch assembly and a reference plane is e+f/2, where e is a distance between the light source and the reference plane, and f is a length of the light source.

Preferably, the adjacent surfaces of the first reflector and the second reflector are respectively provided with a first parabolic curved surface and a second parabolic curved surface.

Preferably, the first parabolic curved surface and the second parabolic curved surface are respectively formed by the rotation of a first parabolic generatrix and a second parabolic generatrix along the reference axis.

Preferably, the surfaces of the first reflector and the second reflector can form a diffuse reflection or a specular reflection respectively.

Preferably, the surfaces of the first reflector and the second reflector respectively form specular reflections.

Preferably, the LED automobile lamp further includes an upper shell, a lower shell and a pin component, wherein the light source component is connected to a lighting system of an automobile by the pin component, and the upper shell and the lower shell are spliced together to form a shell and accommodate the light source component, the driving component and the pin component in a shell cavity; and the shell may allow the light emitted by the light source component to pass through and is provided with an interface for a plug-in end of the pin component to extend out.

Preferably, a fan is installed inside the shell cavity, an air inlet and an air outlet for air to enter and exit are arranged on the shell, and the shell may also be used as a radiator.

The present application has the following beneficial effects:

1) A light source assembly is composed of a heat pipe, a first reflector and a second reflector sleeved outside the heat pipe respectively, and an LED patch assembly arranged between the first reflector and the second reflector and having a plurality of LED patches fixed around the outer wall of the heat pipe, and the first reflector and the second reflector can be used for bidirectional reflection for the LED patch assembly with annular light emission, so that on the one hand, the light intensity distribution of LED automobile lamps meets the specified requirements of published relevant laws and regulations, and on the other hand, compared with the light distribution of traditional halogen lamps, the LED patch assembly has less distortion and can bring better safety and comfort.

2) By adopting four LED patches at positions at 45-degree, 135-degree, 225-degree and 315-degree angles in the middle of the light source component to form an LED patch assembly, the number of LED patches can be reduced to the greatest extent, and a reasonable light intensity distribution can be ensured.

3) By adding a first parabolic curved surface and a second parabolic curved surface which can form diffuse reflection or specular reflection on the adjacent surfaces of the first reflector and the second reflector, the rationality of light intensity distribution can be further improved by using the first parabolic curved surface and the second parabolic curved surface.

4) By installing a fan in the shell formed by splicing the upper shell and the lower shell, air can be continuously passed in and out of the shell cavity by the fan to avoid overheating of the light source component and the driving component.

The features and advantages of the present application will be described in detail by examples with reference to the drawings.

Figure 1:
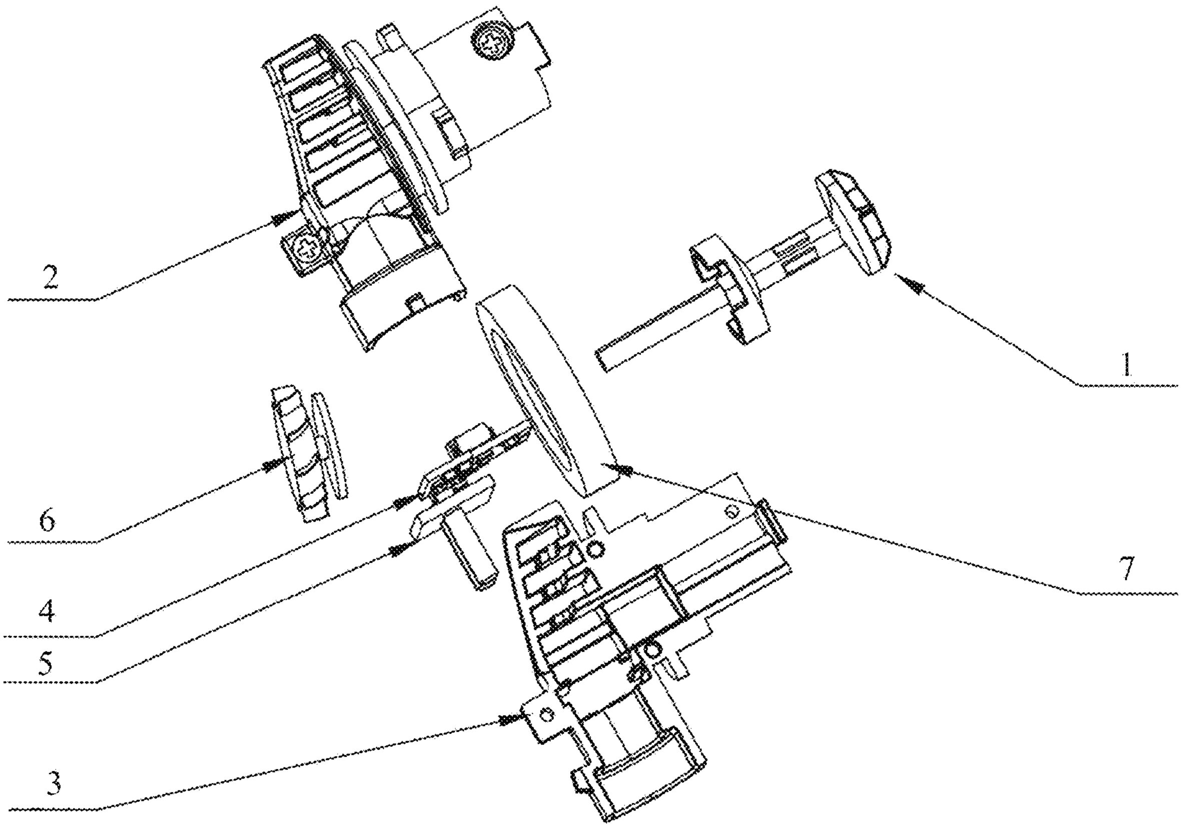
FIG. 1 is an explosion schematic diagram of an LED automobile lamp of the present application.
Figure 2:
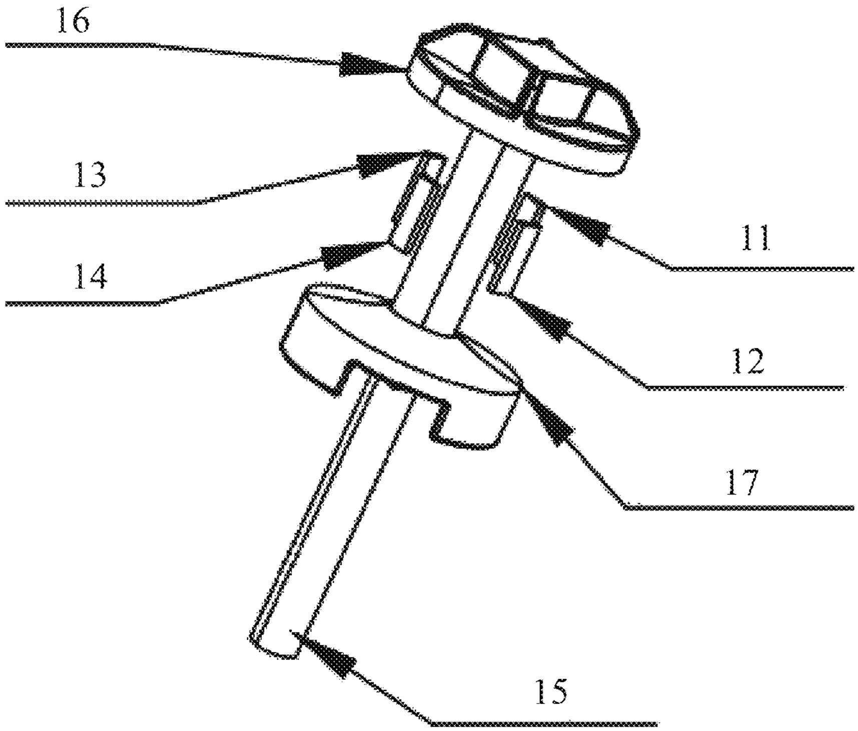
FIG. 2 is a schematic diagram of the three-dimensional structure of the light source component of the LED automobile lamp of the present application.

Reference signs: 1—Light source component, 11—First LED patch, 12—Second LED patch, 13—Third LED patch, 14—Fourth LED patch, 15—Heat pipe, 16—First reflector, 17—Second reflector, 2—Upper shell, 3—Lower shell, 4—Driving component, 5—Pin component, 6—Fan, 7—Elastic rubber ring, 8—Photoelectric detection goniometer, 9—Reference plane, 10—Reference axis.

DESCRIPTION OF EMBODIMENTS

Embodiment 1

Referring to FIGS. 1 to 4, the LED automobile lamp of the present application includes a light source component 1 and a driving component 4. The light source component 1 is driven by the driving component 4 to be bright or dark. The light source component 1 includes a heat pipe 15, a first reflector 16, a second reflector 17 and an LED patch assembly; the first reflector 16 and the second reflector 17 are respectively sleeved outside the heat pipe 15. The LED patch assembly consists of a plurality of LED patches which are respectively fixed around an outer wall of the heat pipe 15 and arranged between the first reflector 16 and the second reflector 17 (that is, two reflectors are respectively arranged on both sides of the LED patch assembly along the axis direction of the heat pipe 15).

The four LED patches (i.e., the first LED patch 11, the second LED patch 12, the third LED patch 13 and the fourth LED patch 14) are rotationally symmetrically distributed with the central axis of the heat pipe 15 as the reference axis 10. Specifically, the normal directions of the light-emitting surfaces of the four LED patches coincide with 45-degree, 135-degree, 225-degree and 315-degree angular positions, respectively (that is, the normal directions of the light-emitting surfaces of the first LED patch 11, the second LED patch 12, the third LED patch 13 and the fourth LED patch 14 coincide with C=45°, C=135°, C=225° and C=315° respectively.

The distance between the geometric center of the LED patch assembly and the reference plane 9 is e+f/2, and e is the distance between the light source and the reference plane 9, in which f is the length of the light source.

The adjacent surfaces of the first reflector 16 and the second reflector 17 are respectively provided with a first parabolic curved surface and a second parabolic curved surface. The first parabolic curved surface and the second parabolic curved surface are respectively formed by the rotation of the first parabolic generatrix and the second parabolic generatrix along the reference axis 10. Among them, the shapes of the first parabolic generatrix and the second parabolic generatrix can be designed according to the parameters of LED chips, such as size, spacing and light intensity distribution.

The surfaces of the first reflector 16 and the second reflector 17 can form specular reflection respectively.

The lamp further includes an upper shell 2, a lower shell 3 and a pin component 5. The light source component 1 is connected to the lighting system of the automobile through the pin component 5. The upper shell 2 and the lower shell 3 are spliced together to form a shell and wrap the light source component 1, the driving component 4 and the pin component 5 into a shell cavity. The shell can allow the light emitted by the light source component 1 to pass through and is provided with an interface for the plug-in end of the pin component 5 to extend out.

A fan 6 is installed in the shell cavity, and an air inlet and an air outlet for air to enter and exit are arranged on the shell, and the shell can also be used as a radiator.

An elastic rubber ring 7 is installed in the shell cavity. The elastic rubber ring 7 is a silica gel ring.

Embodiment 2

Figure 3:
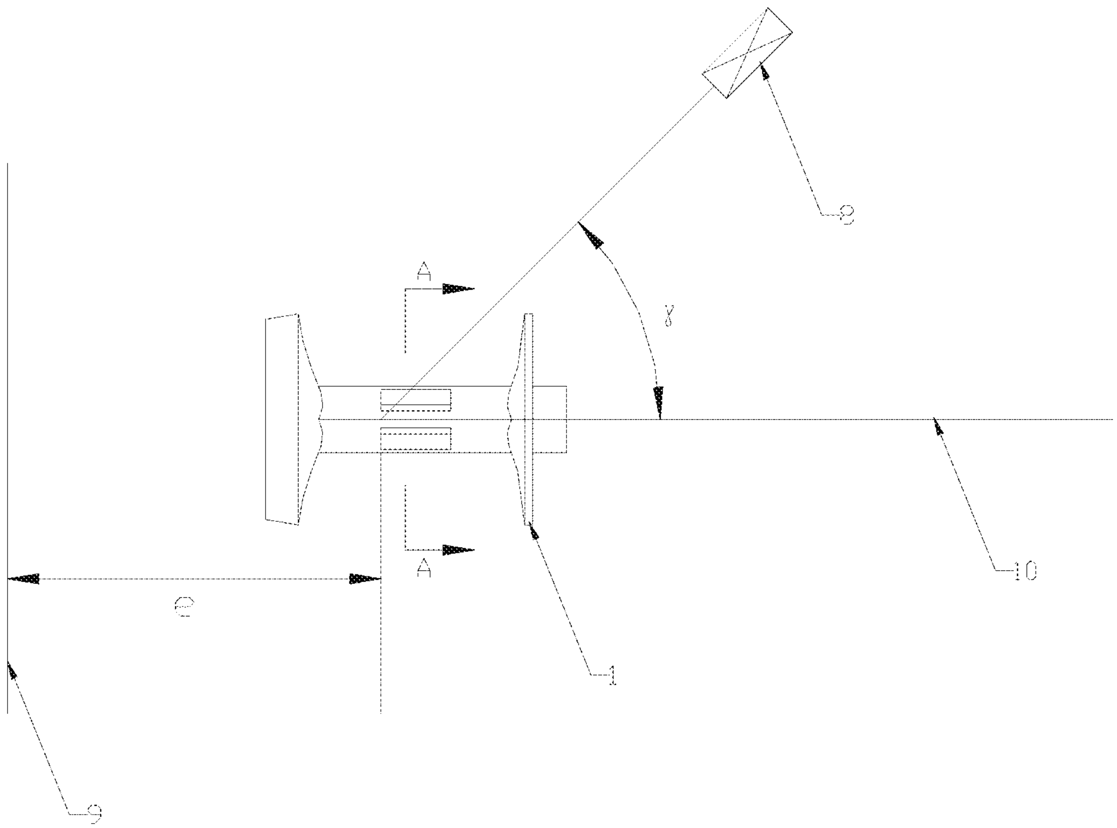
FIG. 3 is a schematic view of the assembly position of the light source component of the LED automobile lamp of the present application.
Figure 4:
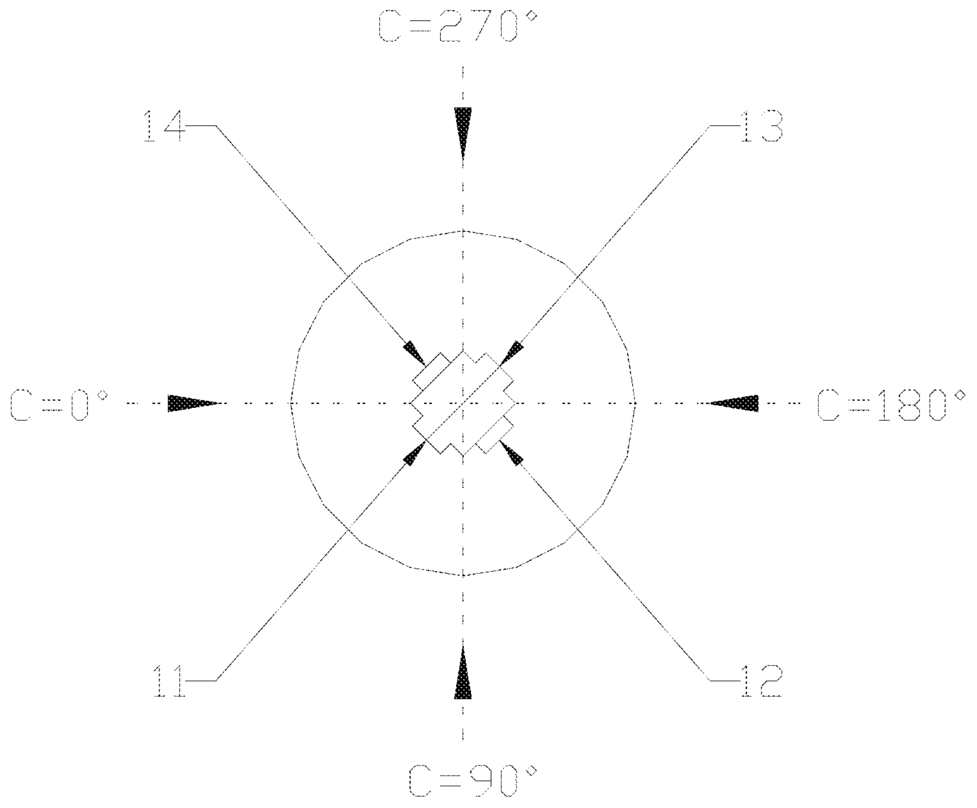
FIG. 4 is a sectional view taken along the line A-A in FIG. 3.

With reference to FIG. 3 and FIG. 4, according to the Regulations ECE R37:2022 3.4.4 and R.E.5:2023 data sheet H11 LED, simulation testing is carried out for the light intensity distribution of the LED automobile lamp prepared in Embodiment 1. The test results are shown in the following tables 1 to 3:

TABLE 1

| Normalized light intensity distribution in black top region | | | | | | | |
|---|---|---|---|---|---|---|---|
| | Standard requirements | | | | | | |
| | Angle γ, | | Standard | Simulation results | | | |
| Test item | plane C | | value | $C_0$ | $C_{90}$ | $C_{180}$ | $C_{270}$ |
| Normalized light distribution (cd/klm) | 13.2 V | 0° | C0/C90/C180/ C270 ≤ 10 | 0 | 0 | 0 | 0 |
| | | 10° | | 0 | 0 | 0 | 0 |
| | | 20° | | 0 | 0 | 0 | 0 |
| | | 30° | | 5.038978 | 4.642885 | 4.922558 | 5.524782 |

TABLE 2

| Normalized light intensity distribution in undistorted region | | | | | | |
|---|---|---|---|---|---|---|
| | Standard requirements | | | Testing results | | |
| Test item | Angle γ, plane C | | Standard value | $C_0$ | $C_{90}$ | $C_{270}$ |
| Normalized intensity distribution (cd/klm) | 13.2 V | 50° | 80-130 | 93.18542 | 90.76433 | 94.88245 |
| | | 60° | | 110.0401 | 109.2262 | 112.4877 |
| | | 70° | | 98.55393 | 94.73423 | 95.21944 |
| | | 80° | | 100.172 | 100.6048 | 100.0173 |
| | | 90° | | 100.5639 | 99.74686 | 100.8663 |
| | | 100° | | 99.52353 | 99.90579 | 100.0042 |
| | | 110° | | 97.2933 | 96.39582 | 96.92254 |
| | | 120° | | 88.69175 | 86.52899 | 87.98973 |
| | | 130° | | 118.2791 | 117.0029 | 119.7168 |
| | | 140° | | 104.3297 | 105.6105 | 104.6452 |

| | Standard requirements | | | Testing results |
|---|---|---|---|---|
| Test item | Plane C, angle γ | | Standard value | γ = 90° |
| Normalized intensity distribution (cd/klm) | 13.2 V | $C_0$ | 80-130 | 111.7376 |
| | | $C_{30}$ | | 96.16785 |
| | | $C_{60}$ | | 98.3024 |
| | | $C_{90}$ | | 110.8298 |
| | | $C_{120}$ | | 96.05047 |
| | | $C_{150}$ | | 96.12046 |
| | | $C_{180}$ | Infinite value | 113.2304 |
| | | $C_{210}$ | 80-130 | 94.44323 |
| | | $C_{240}$ | | 98.96083 |
| | | $C_{270}$ | | 112.0736 |
| | | $C_{300}$ | | 99.02879 |
| | | $C_{330}$ | | 97.01944 |
| | | $C_{360}(C_0)$ | | 111.7376 |

Table 3 Normalized light intensity distribution of shielding area corresponding to the lead-in line of filament light source The above embodiment is an illustration of the present application, not a limitation of the present application. Any solution obtained after simple transformation of the present application shall fall into the protection scope of the present application.

The invention claimed is:

1. An LED automobile lamp, comprising a light source component (1) and a driving component (4), wherein the light source component (1) is driven by the driving component (4) to be bright or dark; the light source component (1) comprises a heat pipe (15), a first reflector (16), a second reflector (17) and an LED patch assembly; the first reflector (16) and the second reflector (17) are respectively sleeved outside the heat pipe (15); the LED patch assembly consists of a plurality of LED patches which are respectively fixed around an outer wall of the heat pipe (15) and arranged between the first reflector (16) and the second reflector (17).

2. The LED automobile lamp according to claim 1, wherein the LED patch assembly comprises four LED patches, and the four LED patches are rotationally and symmetrically distributed with a central axis of the heat pipe (15) as a reference axis (10).

3. The LED automobile lamp according to claim 2, wherein a normal directions of a light-emitting surfaces of the four LED patches coincide with a 45-degree angular position, a 135-degree angular position, a 225-degree angular position and a 315-degree angular position respectively.

4. The LED automobile lamp according to claim 3, further comprising an upper shell (2), a lower shell (3) and a pin component (5), wherein the light source component (1) is connected to a lighting system of an automobile by the pin component (5), and the upper shell (2) and the lower shell (3) are spliced together to form a shell and accommodate the light source component (1), the driving component (4) and the pin component (5) in a shell cavity; and the shell may allow the light emitted by the light source component (1) to pass through and is provided with an interface for a plug-in end of the pin component (5) to extend out.

5. The LED automobile lamp according to claim 4, wherein a fan (6) is installed inside the shell cavity, an air inlet and an air outlet for air to enter and exit are arranged on the shell, and the shell may also be used as a radiator.

6. The LED automobile lamp according to claim 2, further comprising an upper shell (2), a lower shell (3) and a pin component (5), wherein the light source component (1) is connected to a lighting system of an automobile by the pin component (5), and the upper shell (2) and the lower shell (3) are spliced together to form a shell and accommodate the light source component (1), the driving component (4) and the pin component (5) in a shell cavity; and the shell may allow the light emitted by the light source component (1) to pass through and is provided with an interface for a plug-in end of the pin component (5) to extend out.

7. The LED automobile lamp according to claim 6, wherein a fan (6) is installed inside the shell cavity, an air inlet and an air outlet for air to enter and exit are arranged on the shell, and the shell may also be used as a radiator.

8. The LED automobile lamp according to claim 1, wherein a distance between a geometric center of the LED patch assembly and a reference plane (9) is e+f/2, where e is a distance between the light source and the reference plane (9), and f is a length of the light source.

9. The LED automobile lamp according to claim 8, further comprising an upper shell (2), a lower shell (3) and a pin component (5), wherein the light source component (1) is connected to a lighting system of an automobile by the pin component (5), and the upper shell (2) and the lower shell (3) are spliced together to form a shell and accommodate the light source component (1), the driving component (4) and the pin component (5) in a shell cavity; and the shell may allow the light emitted by the light source component (1) to pass through and is provided with an interface for a plug-in end of the pin component (5) to extend out.

10. The LED automobile lamp according to claim 9, wherein a fan (6) is installed inside the shell cavity, an air inlet and an air outlet for air to enter and exit are arranged on the shell, and the shell may also be used as a radiator.

11. The LED automobile lamp according to claim 1, wherein the adjacent surfaces of the first reflector (16) and the second reflector (17) are respectively provided with a first parabolic curved surface and a second parabolic curved surface.

12. The LED automobile lamp according to claim 11, wherein the first parabolic curved surface and the second parabolic curved surface are respectively formed by the rotation of a first parabolic generatrix and a second parabolic generatrix along the reference axis (10).

13. The LED automobile lamp according to claim 12, further comprising an upper shell (2), a lower shell (3) and a pin component (5), wherein the light source component (1) is connected to a lighting system of an automobile by the pin component (5), and the upper shell (2) and the lower shell (3) are spliced together to form a shell and accommodate the light source component (1), the driving component (4) and the pin component (5) in a shell cavity; and the shell may allow the light emitted by the light source component (1) to pass through and is provided with an interface for a plug-in end of the pin component (5) to extend out.

14. The LED automobile lamp according to claim 11, further comprising an upper shell (2), a lower shell (3) and a pin component (5), wherein the light source component (1) is connected to a lighting system of an automobile by the pin component (5), and the upper shell (2) and the lower shell (3) are spliced together to form a shell and accommodate the light source component (1), the driving component (4) and the pin component (5) in a shell cavity; and the shell may allow the light emitted by the light source component (1) to pass through and is provided with an interface for a plug-in end of the pin component (5) to extend out.

15. The LED automobile lamp according to claim 1, wherein the surfaces of the first reflector (16) and the second reflector (17) can form a diffuse reflection or a specular reflection respectively.

16. The LED automobile lamp according to claim 15, wherein the surfaces of the first reflector (16) and the second reflector (17) respectively form specular reflections.

17. The LED automobile lamp according to claim 16, further comprising an upper shell (2), a lower shell (3) and a pin component (5), wherein the light source component (1) is connected to a lighting system of an automobile by the pin component (5), and the upper shell (2) and the lower shell (3) are spliced together to form a shell and accommodate the light source component (1), the driving component (4) and the pin component (5) in a shell cavity; and the shell may allow the light emitted by the light source component (1) to pass through and is provided with an interface for a plug-in end of the pin component (5) to extend out.

18. The LED automobile lamp according to claim 15, further comprising an upper shell (2), a lower shell (3) and a pin component (5), wherein the light source component (1) is connected to a lighting system of an automobile by the pin component (5), and the upper shell (2) and the lower shell (3) are spliced together to form a shell and accommodate the light source component (1), the driving component (4) and the pin component (5) in a shell cavity; and the shell may allow the light emitted by the light source component (1) to pass through and is provided with an interface for a plug-in end of the pin component (5) to extend out.

19. The LED automobile lamp according to claim 1, further comprising an upper shell (2), a lower shell (3) and a pin component (5), wherein the light source component (1) is connected to a lighting system of an automobile by the pin component (5), and the upper shell (2) and the lower shell (3) are spliced together to form a shell and accommodate the light source component (1), the driving component (4) and the pin component (5) in a shell cavity; and the shell may allow the light emitted by the light source component (1) to pass through and is provided with an interface for a plug-in end of the pin component (5) to extend out.

20. The LED automobile lamp according to claim 19, wherein a fan (6) is installed inside the shell cavity, an air inlet and an air outlet for air to enter and exit are arranged on the shell, and the shell may also be used as a radiator.

* * * * *